US008950895B2

(12) United States Patent
Vinther et al.

(10) Patent No.: US 8,950,895 B2
(45) Date of Patent: Feb. 10, 2015

(54) MOVING HEAD LIGHT FIXTURE WITH PROTRUDING DIFFUSER COVER AND MULTIPLE LIGHT SOURCES

(75) Inventors: Thomas Vinther, Beder (DK); Claus Hansen, Hornslet (DK)

(73) Assignee: Martin Professional ApS, Aarhus N. (DK)

( * ) Notice: Subject to any disclaimer, the term of this patent is extended or adjusted under 35 U.S.C. 154(b) by 240 days.

(21) Appl. No.: 13/642,176

(22) PCT Filed: Apr. 5, 2011

(86) PCT No.: PCT/DK2011/050111
§ 371 (c)(1),
(2), (4) Date: Oct. 19, 2012

(87) PCT Pub. No.: WO2011/131198
PCT Pub. Date: Oct. 27, 2011

(65) Prior Publication Data
US 2013/0033865 A1 Feb. 7, 2013

(30) Foreign Application Priority Data

Apr. 23, 2010 (DK) .................................. 2010 00361
Feb. 24, 2011 (DK) .................................. 2011 70101

(51) Int. Cl.
*F21V 13/00* (2006.01)
*F21V 21/30* (2006.01)
(Continued)

(52) U.S. Cl.
CPC .......... *H05B 33/0857* (2013.01); *F21V 7/0083* (2013.01); *F21V 21/30* (2013.01);
(Continued)

(58) Field of Classification Search
CPC ............... F21V 3/00; F21V 3/02; F21V 5/00; F21V 5/04; F21V 5/006; F21V 5/007; F21V 21/14; F21V 21/30; F21K 9/00; F21Y 2101/02

USPC .................. 362/235, 249.02, 249.03, 249.07, 362/249.1, 249.14, 311.02, 311.06, 311.1, 362/311.14, 285, 287, 418, 427, 355, 359, 362/360, 361, 240, 242, 246, 249.09
See application file for complete search history.

(56) References Cited

U.S. PATENT DOCUMENTS

| 4,409,646 A | 10/1983 | Baliozian |
| 5,651,602 A | 7/1997 | Tawil et al. |

(Continued)

FOREIGN PATENT DOCUMENTS

| CN | 201014318 | 1/2008 |
| DE | 10318330 | 1/2005 |

(Continued)

OTHER PUBLICATIONS

International Search Report; International Application No. PCT/DK2011/050111; International Filing Date: Apr. 5, 2011; 4 pages.

(Continued)

*Primary Examiner* — Thomas M Sember
(74) *Attorney, Agent, or Firm* — Blank Rome LLP

(57) ABSTRACT

The present invention relates to a moving head light fixture comprising a base; a yoke connected rotatable to the base and a head connected rotatable to the yoke. The head comprises a number of light sources and a number of light collecting means arranged in the head, where the number of light collecting means collect and convert light from at least one of the light sources into a number of source light beams which are emitted from said head. The head comprises a diffuser cover, which comprises at least one diffuser region. The diffuser region receives and diffuses at least a part of the light and at least a part of the diffuser cover protrudes from the head. The invention relates to a illumination system comprising such a moving head and a diffuser cover protruding from the head of for a moving head light fixture.

16 Claims, 6 Drawing Sheets

(51) Int. Cl.
| | |
|---|---|
| *H05B 33/08* | (2006.01) |
| *F21V 7/00* | (2006.01) |
| *H05B 37/02* | (2006.01) |
| *F21V 3/00* | (2006.01) |
| F21S 10/02 | (2006.01) |
| F21Y 101/02 | (2006.01) |
| G02B 5/02 | (2006.01) |
| G02B 26/08 | (2006.01) |
| F21W 131/406 | (2006.01) |

(52) U.S. Cl.
CPC .......... *H05B33/0803* (2013.01); *H05B 37/029* (2013.01); *F21V 3/00* (2013.01); *F21S 10/023* (2013.01); *F21Y 2101/02* (2013.01); *G02B 5/0278* (2013.01); *G02B 26/08* (2013.01); *F21S 10/02* (2013.01); *F21W 2131/406* (2013.01)
USPC . 362/242; 362/246; 362/249.09; 362/249.11; 362/287; 362/427

(56) References Cited

U.S. PATENT DOCUMENTS

| | | | | |
|---|---|---|---|---|
| 6,519,089 | B2 * | 2/2003 | Graham | 359/599 |
| 7,207,696 | B1 * | 4/2007 | Lin | 362/249.03 |
| 8,277,080 | B2 * | 10/2012 | Duffy et al. | 362/249.02 |

FOREIGN PATENT DOCUMENTS

| | | |
|---|---|---|
| DE | 10346076 | 4/2005 |
| DE | 202007004078 | 7/2008 |
| JP | 2007194132 | 8/2007 |
| JP | 2009009809 | 1/2009 |
| WO | WO2009/114646 | 9/2009 |
| WO | WO2009114646 A2 | 9/2009 |
| WO | WO2009114646 A3 | 9/2009 |
| WO | WO2009140872 | 11/2009 |
| WO | WO2010025737 | 3/2010 |

OTHER PUBLICATIONS

Extended European Search Report dated Apr. 30, 2014 issued for a related/corresponding European Application; European Application No. 11771615.9; 10 pages.
English abstract; German Application No. DE10318330; 1 page.
First Office Action dated Jun. 17, 2014; China Application No. 201180018964.3; 5 pages.
Search Report dated Jun. 3, 2014; China Application No. 201180018964.3; 2 pages.
English translation; Search Report dated Jun. 3, 2014; China Application No. 201180018964.3; 2 pages.
English translation of China Publication No. CN201014318 cited in Search Report issued in China Application No. 201180018964.3; 2 pages, Jun. 3, 2014.

* cited by examiner

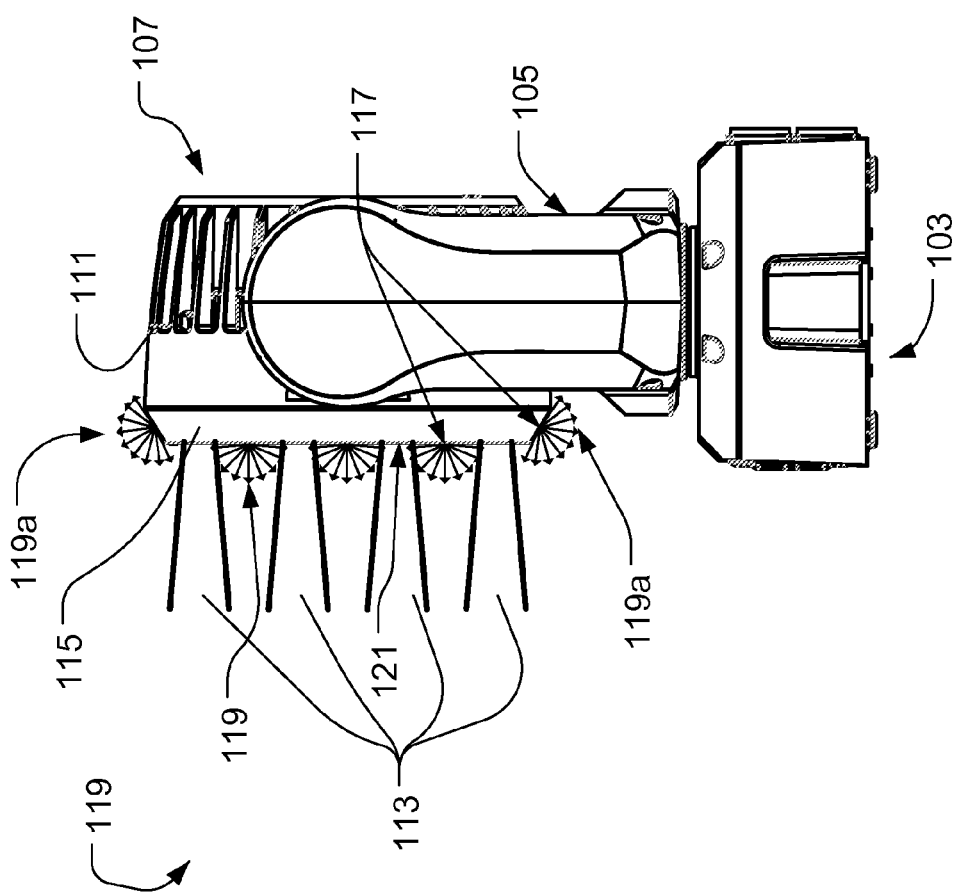
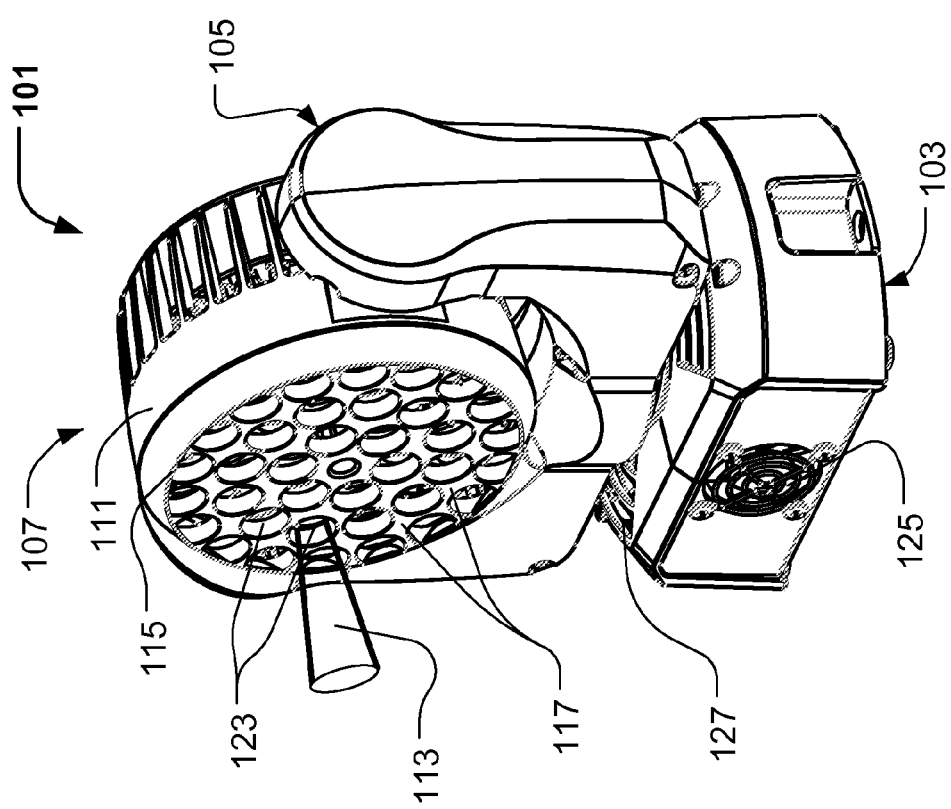

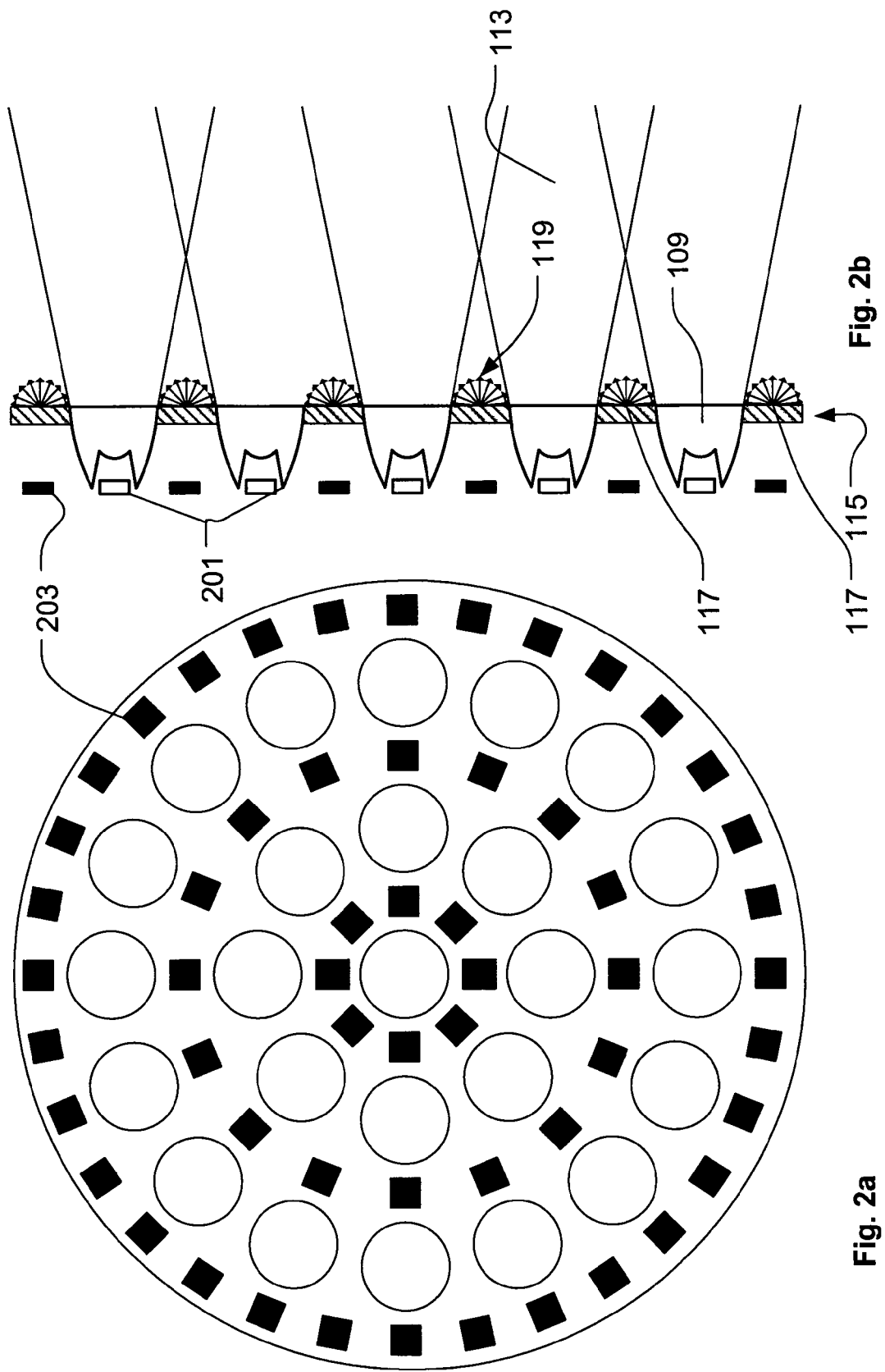

MOVING HEAD LIGHT FIXTURE WITH PROTRUDING DIFFUSER COVER AND MULTIPLE LIGHT SOURCES

FIELD OF THE INVENTION

The present invention relates to an illumination device comprising a number of light sources and a number of light collecting means arranged in a housing, said number of light collecting means collect and convert light from at least one of said light sources into a number of source light beams, said light source beams are emitted from said housing.

BACKGROUND OF THE INVENTION

Light fixtures creating various effects are getting more and more used in the entertainment industry in order to create various light effects and mood lighting in connection with live shows, TV shows or as a part on architectural installation.

Entertainment light fixtures creates typically light beam having a beam width and a divergence and could for instance be wash/flood fixtures creating a relatively wide light beam with a uniform light distribution or it could be profile fixtures adapted to project image onto a target surface. There is a tendency that more and more of this kind of fixtures are used in each show or each installation and the fixtures gets as a consequence more and more visible for the spectators and/or TV viewers. The light fixtures typically create the lighting effect at a distance from the light fixture it self and the light fixture is thus not as interesting and esthetic to look at. The fixture manufactures tries as a consequence to provide the fixtures with esthetic designs in order to make the fixtures more interesting to look at. However this is very difficult as the housing of the fixtures are typical dependent physical requirements defined by the technical specifications of the fixture such as optics, mechanics, electronics, cooling etc.

The LED component has further as a light source changed the look of most lighting luminaries, when using multiple LEDs to replace a single light source. This implies for all lighting industries—general, domestic, industrial, entertainment etc. The most visible change is that all multiple light sources are now exposed to the viewer and the light emits from a larger area. If the light luminaire is a color mixing version with single color LEDs, then all LED colors used are visible. Now that most LED fixtures have visible LEDs, some customers dislike the look of multiple light dots. Instead a more uniform, even light exit is requested, to avoid the cheap looking "funfair" look with an extreme amount of light sources.

Lately it there has been a trend to set up a large number of moving head light fixtures in a matrix controlled by a central controller. In these systems the central controlled can treated each moving head light fixture as pixel and thereby use the matrix of moving head light fixtures as a video display, where each pixel can move. This creates new light effect as various effects can be created by combining the movement of each pixel with the video content. Further various of mid air effect can be created when haze or air issued connection with these displays as the light emitted by the moving heads light fixtures can be scattered by the smoke and/or haze.

DESCRIPTION OF THE INVENTION

The object of the present invention is to solve the above described limitations related to prior art. This is achieved by an illumination device, diffuser cover and illumination system as described in the independent claims. The dependent claims describe possible embodiments of the present invention. The advantages and benefits of the present invention are described in the detailed description of the invention.

DESCRIPTION OF THE DRAWING

FIG. 1a-c illustrate a moving head lighting fixture where the head is embodied according to the present invention;

FIG. 2a-2b illustrate another setup of an illumination device according to the present invention;

DETAILED DESCRIPTION OF THE INVENTION

The present invention is described in view of a moving head lighting fixture including a number of LEDs that generate a light beam, however the person skilled in the art realizes that the present invention can be used in moving head light fixtures using any kind of light source such as discharge lamps, OLEDs, plasma sources, halogen sources, fluorescent light sources, etc.

Figure 1A:
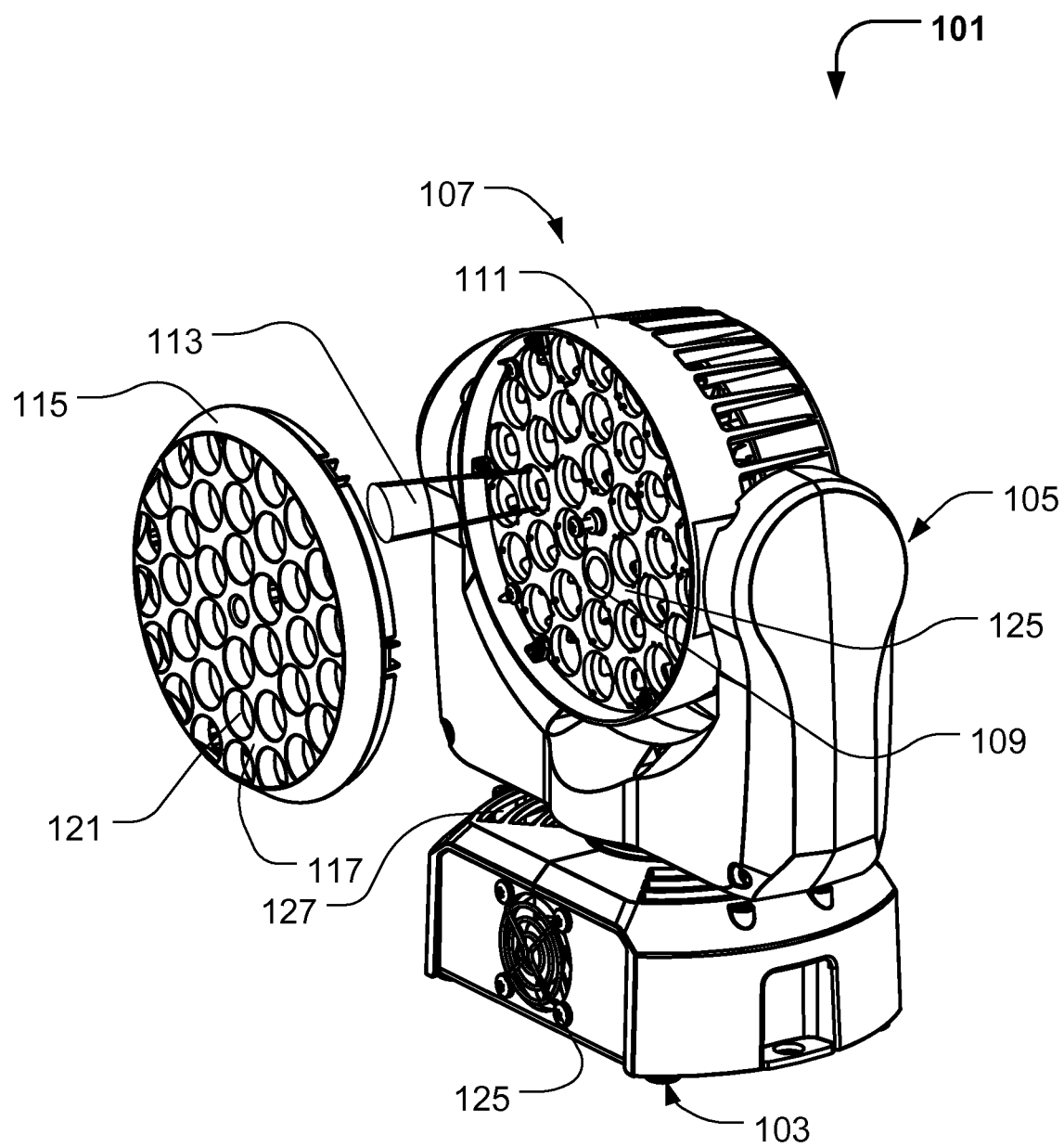

FIGS. 1a-1c illustrate a moving head light fixture according to the present invention where FIG. 1a is a perspective view where the diffuser cover 115 has been exploded, FIG. 1b is perspective view with the diffuser cover 115 mounted and FIG. 1c is a side view. The illumination device is a moving head lighting fixture 101 comprising a base 103, a yoke 105 rotatable connected to the base 103 and a head 107 rotatable connected to the yoke 105.

In the illustrated embodiment, the head 107 comprises a number of light sources (not visible) and a number of light collecting means 109 arranged in the head housing 111. The light collecting means collect and convert light from at the light sources into a number of source light beams 113 (only one illustrated) and the light source beams are emitted from the head 107. The head comprises a diffuser cover 115. The diffuser cover comprises at least one diffuser region 117 that receives at least a part of the light generated by the light sources and diffuses the received light as indicated by arrows 119 (only indicated on FIG. 1c for the sake of simplicity). The diffuser cover comprises further at least one non-diffusing region 121 where through at least at part of said number of source light beams 113 pass without being diffused. It is to be noted that only some of the light source beams are illustrated for the sake of simplicity. The result is that the dotted LED front look is removed, by lighting up the diffuser cover as light is emitted from both the non-diffusing regions and diffusing regions and the areas between the lenses are illuminated with the existing internal stray light from the LEDs are diffused into the surroundings.

The head housing 107 is in the illustrated embodiment "bucket" shaped and a display (positioned at the not visible side), main PCB (Printed Circuit Board), a fan, a heat sink, an LED PCB, a lens assembly are stacked in the head housing. The lens assembly comprises a lens holder 125 and a lens array comprising the light collecting means 109. The head is rotatable connected to the yoke by two tilt bearings and which are supported by the yoke. The LED PCB comprises a number of LEDs emitting light and which in cooperation with the light collecting means 109 in the lens array generate a number of light source beams. The main PCB comprises controlling circuits and driving circuits (not shown) for controlling the LEDs as known in the art of illumination devices. The main PCB comprises further a number of switches (not shown) which extend through a number of holes in the head outer shell 109. The switches and display act as a user interface allowing a user to communicate with the moving head lighting fixture.

The yoke are connected to a pan bearing rotatable connected to the base 103. The base comprises 5-Pin XLR male and female connectors (not shown) for DMX signals as known in the art of entertainment lighting; input and output power connectors (not shown), power supply PCB's (not shown) and fan (not shown). The fan forces air into the base through vent hole 127 and out of the base through vent hole 129.

At least a part of the diffuser cover protrudes from the housing and a part of the light is as a consequence diffused sidewards and backwards (as indicated by arrows 119*a*) in relation to the source light beams. The diffusing regions of the diffuser cover can be lit up both from behind the surface and from the side and thereby function as a light guide. The light fixture can as a consequence be viewed from multiple angles and the protruding diffuser cover provides a new light effect to the light fixture. This provides new additional light effects to moving head light fixtures as the protruding diffuser cover will appear as a 3-dimensional illuminated object.

This effect can for instance be used in illumination systems where a large number of moving head light fixtures are set up in a matrix controlled by a central controller treating each moving head light fixture as pixel. Each moving head lighting fixture can then act as a 3-dimentional pixel which can be seen from many sides. A dynamic video display where each pixel acts as a movable 3-dimensional object is hereby created and new and very exiting light effects can be created.

The non-diffusing regions can be embodied as clear areas like plane transparent surfaces arranged above the light collecting means. Such clear plane transparent surfaces will allow the light source beams to pass without diffusing the light source beams. However the clear areas can be adapted to adjust the beam divergence of the light source light beam but the outgoing light beam will still be a well defined light beam. The diffuser cover can thus be embodies in clear polymer where the diffusing regions are created by etching the surface of the diffuser cover. The diffusing region can also be created by coating the regions where the diffusing region is to be positioned. The diffusing cover can further be molded where the moulds are adapted to define the non diffusing regions and the diffusing regions. The non diffusing regions can also be embodied as apertures or cut outs arranged above the light collecting means.

The diffuser cover can also comprise fastening means which enables a user to attach a diffuser cover to the moving head light fixture. The diffuser cover can thus be provided as a standard component or as an optional accessory.

FIGS. 2*a-b* illustrate another setup of the illumination device according to the present invention. FIG. 2*a* illustrate a top view and FIG. 2*b* illustrates a cross sectional view. In this setup, the number of light sources are arranged in a first group 201 (illustrated as white blocks) of light sources and in a second group 203 (illustrated as black blocks) of light sources. The light collecting means 109 collect and convert light from at the first group of light sources 201 into a number of source light beams 113. The first group of light sources are in the illustrated embodiment arranged below a number or TIR lenses. The light beams pass through the non-diffusing regions 121 of the diffusing cover 115. The diffuser regions receives light generated by the second group of light sources 203 and diffuses 119 the received light. The consequence is that a new light effect can be created as the area between the light beams can have another color emitted by the second group of light sources. This look can by dynamic if first group of light sources and the second group of light sources are independently controlled as known in the art of entertainment lighting. Further it isposible to adapt the second group of light sources to emit the same color as the first group of light sources whereby the dotted look of a traditional LED light fixture can be removed.

The second group of light sources functions as background lighting with own DMX control and both color and intensity can be varied independently of the first group of light sources. They can also be intensity and color linked with primary LED color in a predetermined manner or has separate control for contrast colors or other intensity. This adjustment/control of the light sources can be done remotely from central control unit or at the fixture itself.

It is noted that:
  the Invention applies to both multichip LEDs and single color LEDs.
  the Invention applies to both profile and wash luminaires.
  the invention applies to any light source technology.
  that the invention eliminates or minimizes the dotted look of an LED lighting fixture with multiple LED lenses exposed to the spectator.
  the second light source group can be used as new additional effect feature on the fixture and function both as an attention gimmick, but more importantly as an individual pixel when used in multiple unit setups. So it is both a mid-air beam and a lit up surface.
  the second light source group can also be used to indicate errors or other fixture status information.
  the invention creates a possibility of making the light/color visible from other angles than purely from the front.
  the secondary light source can be used as an interactive part of the fixture—reacting according to surroundings.
  the illumination device according to the present invention when the fixture is used in multiple unit setups (eg. a large scale matrix) the primary light source can be turned off or dimmed, so the fixture changes from being an automated mid-air beam to become a graphical pixel with a glowing non-blinding surface. Appropriate effect generator controls (eg. media servers) are then able to display video content or simple color waves/patterns on the complete fixture setup.
  the user will be able to run two individual light sequences or media content on the same fixture.—one content generated by the first group of light sources and another content generated by the second group of light sources.
  That error messages or fixture status can be communicated via colors, color combinations, flashes or other effects by the secondary light source
  that via an internal or external sensing/tracking technology, the secondary light source can act according to a predefined reaction pattern (color, intensity or flashing). The input could be personal behavior, temperature changes, room light level, humidity etc.)

Figure 3:
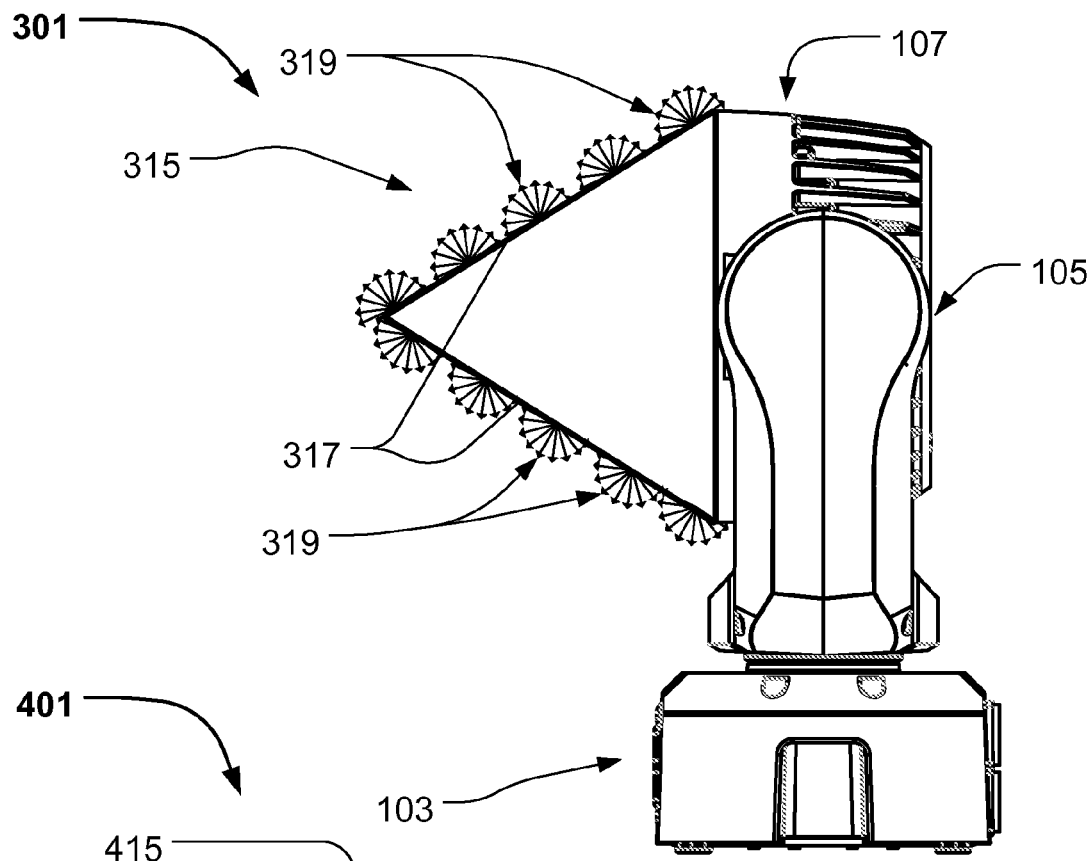
FIG. 3 illustrates another embodiment of a moving heal lighting fixture according to the present invention.

FIG. 3 illustrates another embodiment of the moving head lighting fixture illustrated in FIG. 1*a*-1*c*. In this embodiment the diffuser cover is formed as a diffusing cone 315 which protrudes from the head. The diffusing cone 315 comprises a diffusing region 317 which constitute the entire surface of the diffusing cover 315. All light emitted by the light sources will thus be diffused in many directions as illustrated by arrows 319. The diffusing cone 315 will thus appear as a bright 3-dimensional illuminative object which can be moved in various patterns.

Figure 4:
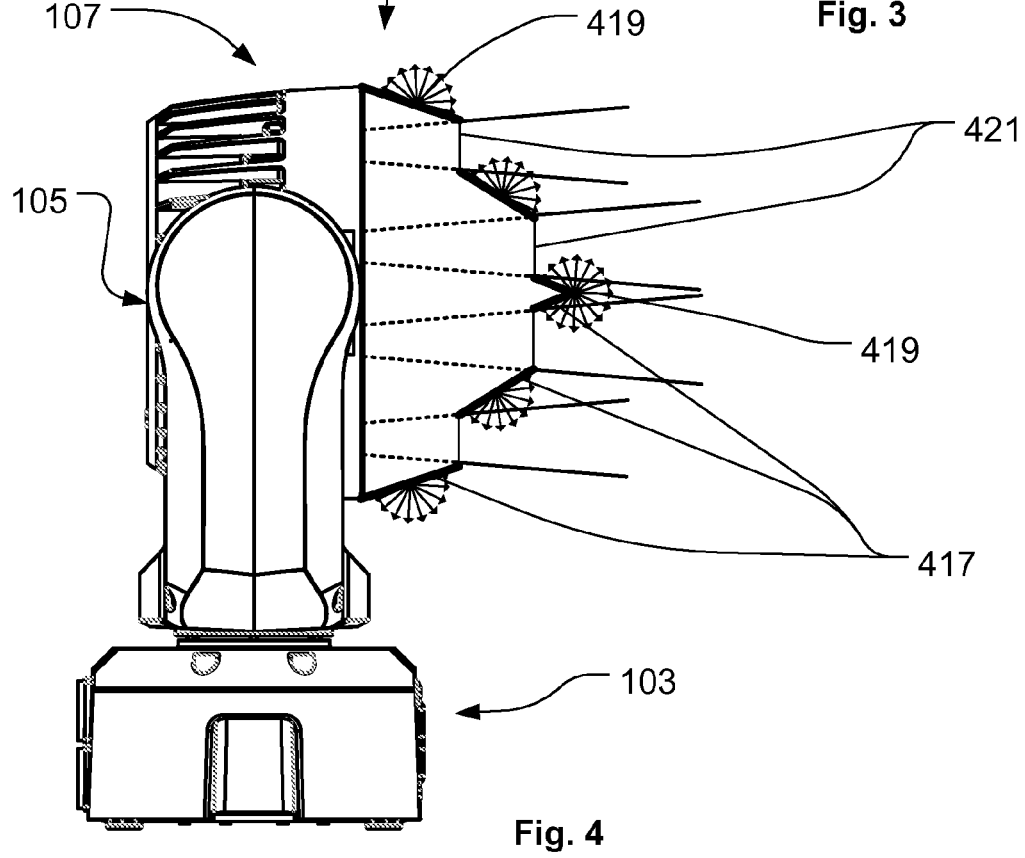
FIG. 4 illustrates yet another embodiment of a moving heal lighting fixture according to the present invention.

FIG. 4 illustrates another embodiment of the moving head light fixture illustrated in FIG. 1a-1c. In this embodiment the diffusing cover is formed as a stepped diffusing cone 415 comprising a number of cone shaped diffusing regions 417 and a number of flat non-diffusing regions 421. The diffuser regions 417 receive at least a part of the light generated by the light sources and diffuse the received light as indicated by arrows 419. At at least at part of the light 413 pass through the flat non-diffusing regions 421 without being diffused. It is to be noted that only some of the light source beams are illustrated for the sake of simplicity. The stepped diffusing cone 415 will appear as a bright 3-dimensional illuminative object where the non-diffused light 413 for instance can be used for projection and/or mid air effects.

Figure 5:
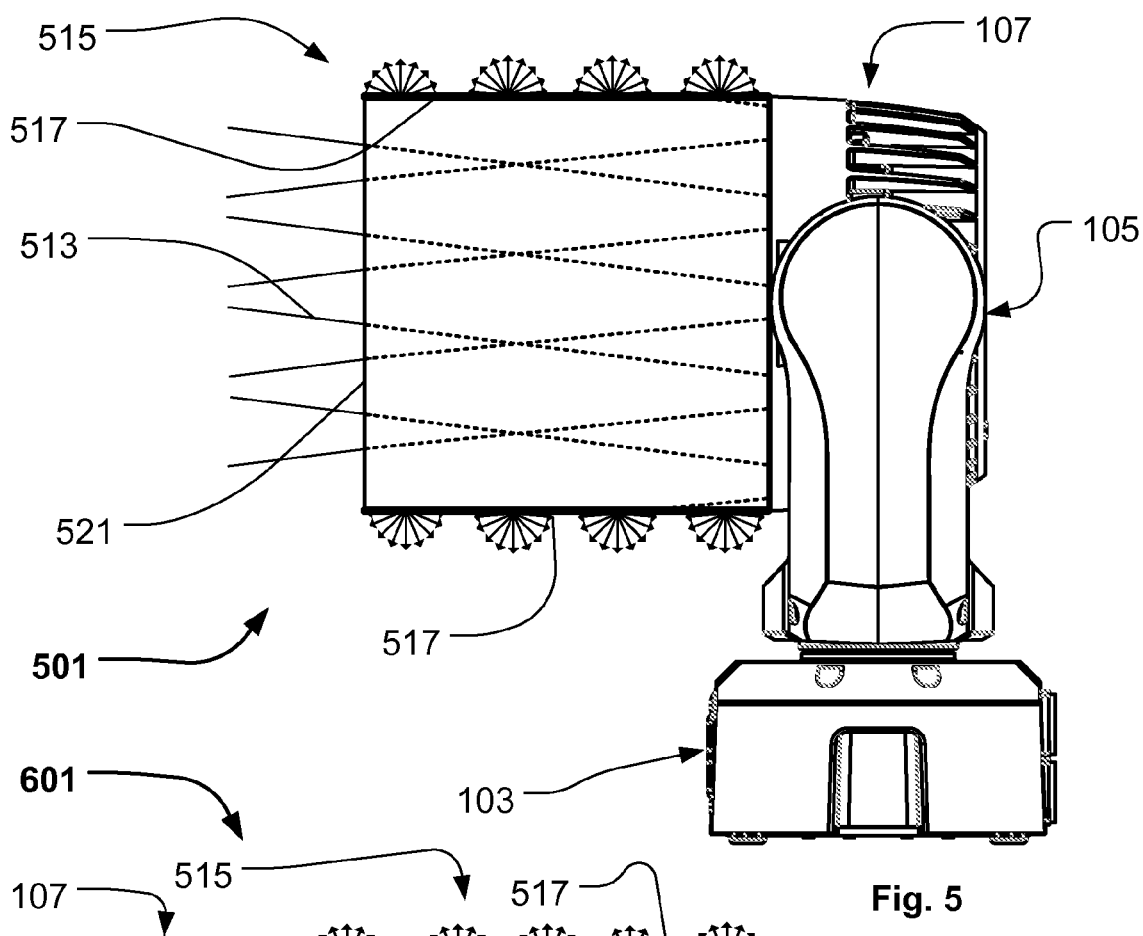
FIG. 5 illustrates yet another embodiment of a moving heal lighting fixture according to the present invention.
Figure 6:
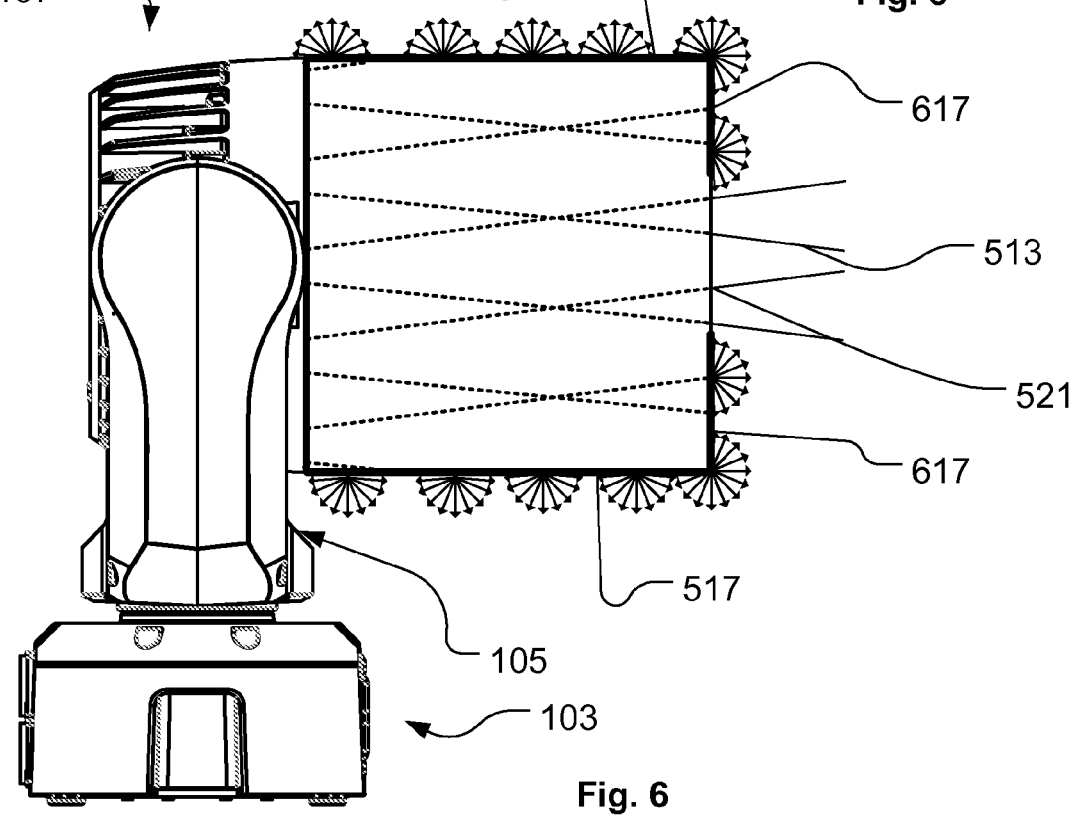
FIG. 6 illustrates yet another embodiment of a moving heal lighting fixture according to the present invention.

FIGS. 5 and 6 illustrate other embodiments of the moving head light fixture illustrated in FIG. 1a-1c. In these embodiments the diffusing cover is formed as a diffusing cylinder 515 where the sides are embodies as diffusing regions 517 and where the top is formed as non-diffusing regions 521. The consequences is that most of the light is emitted as non-diffused light through the top of the cylinder and can be used for projections and/or mid air effects and the diffusing cylinder acts also as a movable 3-dimensional illuminative object. In FIG. 6, however a part of the top is also formed as a diffusing region 617 whereby the top also can be seen from many sides.

The illustrated embodiments of the protruding diffusing cover serves as illustrating examples of possible shapes and the skilled person will realize that many different shapes can be constructed depending on the desired looks and effects. The diffusing cover can be construed as one ridge body which will follow the movement of the head. The cover can for instance be molded in plastic and be hollow which decreased the weight of the diffusing covered whereby the head can easier move around. However the skilled person realizes that the diffusing cover also can be constructed from a solid material. Further the diffusing cover can be constructed by a frame work of for instance metal, wood or plastic or carbon which is covered by a diffusing film.

Figure 7:
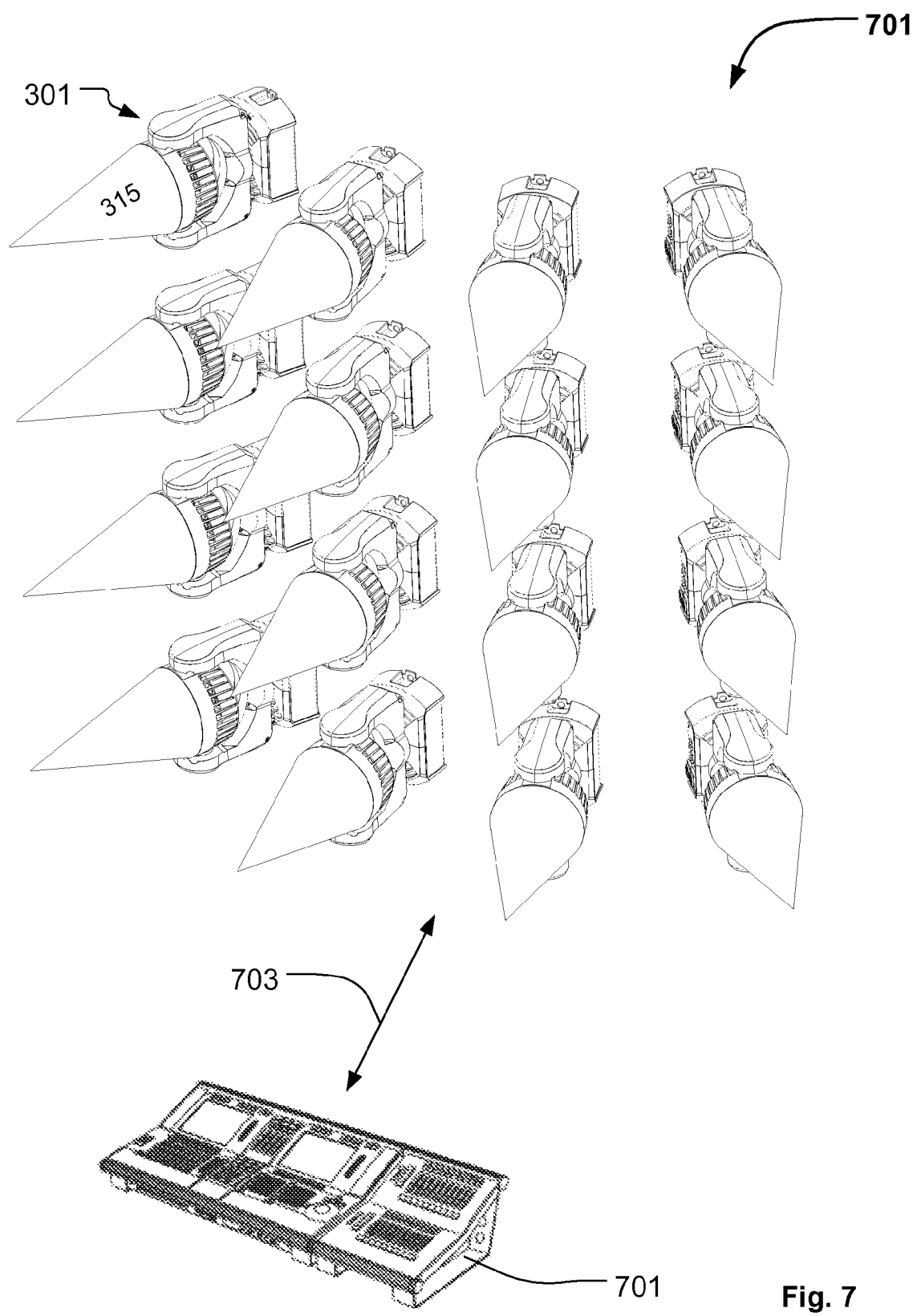
FIG. 7 illustrates a illumination system according to the of the present invention.

FIG. 7 illustrates an illumination system 700 according to one aspect of the present invention. The illumination system 700 comprises a central controller 701 connected to and controlling 703 a number of moving head light fixtures 301(only top left moving head light fixture is labeled for sake of simplicity). The connection between the central controller are for simplicity illustrated as arrow 703 and the person skilled in the art of lightning understands that the connection can be created by a number of cables/wires and/or through wireless network. The communication can or instance be based on a standard lightning communication protocol such as DMX 512, USITT DMX 512 1990, USITT DMX 512-A, DMX-512-A including RDM as covered by ANSI E1.11 and ANSI E1.20 standards or Wireless DMX. ACN designates Architecture for Control Networks; ANSI E1.17—2006). ArtNet or ArtnetII is supplied by Artistic License Ltd. Alternatively the communication can also be based on protocols for distributing video content.

In this embodiment the moving head light fixtures are arranged in a 4×4 matrix and the illumination system 701 acts thus as a simple display. The moving head light fixtures comprise a base, a yoke connected rotatable to the base and a head connected rotatable to the yoke. The head comprises a number of light sources and a number of light collecting means arranged in the head. The light collecting means collect and convert light from the light sources into a number of source light beams, which are emitted from the head. The head of the moving head light fixtures comprises further a diffuser cover 315 comprising at least one diffuser region. The diffuser region is adapted to receive and diffuse at least a part of the light generated by the light sources and at least a part of the diffuser cover protrudes from the head. In the illustrated embodiment the moving head light fixtures 301 is similar to the moving head light fixture 301 illustrated in FIG. 3 and comprises a diffuser cone 315 protruding from the head. The central controller 701 can be adapted to send pixel data to each of the moving heads in the matrix and each moving head constitute a part of a larger structure like a pixel in a video display. The pixel data is at least indicative of the color of the light that the moving head light fixture should emit and the position of the head in relation the yoke and base. The matrix of moving head light fixtures can in this way be adapted to appear as a dynamic and color changing 3-dimensional structure, as the protruding diffuser cover appears as illuminative surface. As a consequence new and existing light effects can be created by combining the movement of each diffusing cone and the fact that the color of each moving head can be changed.

It is to be understood that all types of moving head light fixtures having a protruding diffuser cover can be used. Further it is to be understood that the illumination device can comprise any number of moving head light fixtures and that the moving head light fixtures can be arrange in any shaped matrix. Further it is to understood that the moving head light fixtures can be of different types and that that other lightning devices, smoke/haze generators and various displays can be a part of the illumination system 700.

The invention claimed is:

1. A moving head light fixture comprising:
a base;
a yoke connected rotatably to said base;
a head connected rotatably to said yoke;
said head comprising a number of light sources and a number of light collectors collecting means arranged in said head, said number of light collectors collecting light from at least one of said light sources and converting said collected light into a number of source light beams, said source light beams being emitted from said head, wherein said head comprises a diffuser cover, said diffuser cover comprising at least one non-diffusing region through which at least a part of said number of source light beams pass without being diffused, said diffuser cover further comprising at least one diffuser region that receives and diffuses at least a part of said light generated by said light sources, and wherein at least a part of said diffuser cover protrudes from said head and diffuses a part of said received light sidewards and backwards in relation to the source light beams.

2. The moving head light fixture according to claim 1 wherein said diffuser cover is embodied as a rigid body.

3. The moving head light fixture according to claim 1 wherein at least one non-diffusing region is a clear area arranged above said light collectors.

4. The moving head light fixture according to claim 1 wherein at least one non-diffusing region is an aperture arranged above said light collectors.

5. The moving head light fixture according claim 1 wherein said number of light sources are arranged in at least a first group of light sources and in a second group of light sources, said number of light collectors collecting light from said first group of light sources and converting said collected light into a number of source light beams, wherein said diffuser region receives light generated by said second group of light sources and diffuses said received light.

6. The moving head light fixture according to claim 5 wherein said first group of light sources and said second group of light sources are independently controllable.

7. A diffuser cover for a moving head light fixture, said moving head light fixture comprises:
a base;
a yoke connected rotatably to said base;
a head connected rotatably to said yoke;
said head comprising a number of light sources and a number of light collectors arranged in said head, said number of light collectors collecting light from at least one of said light sources and converting said collected light into a number of source light beams, said source light beams being emitted from said head wherein said diffuser cover comprises at least one non-diffusing region and one diffuser region, where at least a part of said number of source light beams pass through said non-diffusing region without being diffused, and where said diffuser region receives and diffuses at least a part of said light generated by said light sources and at least a part of said diffuser cover protrudes from said head and diffuses a part of said received light sidewards and backwards in relation to the source light beams.

8. The diffuser cover according to claim 7 wherein said diffuser cover is embodied as a rigid body.

9. The diffuser cover according to claim 7 wherein at least one non-diffusing region is a clear area.

10. The diffuser cover according to claim 7 wherein at least one non-diffusing region is an aperture.

11. An illumination system comprising a central controller connected to and controlling a number of moving head light fixtures, said moving head light fixtures comprising:
a base;
a yoke connected rotatably to said base;
a head connected rotatably to said yoke;
said head comprising a number of light sources and a number of light collectors collecting means arranged in said head, said number of light collectors collecting light from at least one of said light and converting said collected light into a number of source light beams, said source light source beams being remitted from said head, wherein at least one of said moving head light fixtures comprises a head comprising a diffuser cover, said diffuser cover comprises at least one diffuser region that receives and diffuses at least a part of said light generated by said light sources, where at least a part of said diffuser cover protrudes from said head, where a plurality of said moving head light fixtures are arranged in a matrix, and where said central controller sends pixel data to said plurality of said moving head light fixtures in said matrix.

12. A moving head light fixture comprising:
a base;
a yoke connected rotatably to said base;
a head connected rotatably to said yoke;
said head comprising a number of light sources and a number of light collectors arranged in said head, said number of light collectors collecting light from at least one of said light sources and converting said collected light into a number of source light beams, said source light beams being emitted from said head, wherein said head comprises a diffuser cover, said diffuser cover comprising at least one diffuser region that receives and diffuses at least a part of said light generated by said light sources, where at least a part of said diffuser cover protrudes from said head, where said number of light sources are arranged in at least a first group of light sources and a second group of light sources, where said number of light collectors collect light from said first group of light sources and convert said collected light into a number of source light beams, and where said diffuser region receives light generated by said second group of light sources and diffuses said received light.

13. The moving head light fixture according to claim 12 wherein said first group of light sources and said second group of light sources are independently controllable.

14. An illumination system comprising a central controller connected to and controlling a number of moving head light fixtures, wherein at least one of said moving head light fixtures comprises:
a base;
a yoke connected rotatably to said base;
a head connected rotatably to said yoke;
said head comprising a number of light sources and a number of light collectors arranged in said head, said number of light collectors collecting light from at least one of said light sources and converting said collected light into a number of source light beams, said source light beams being emitted from said head, wherein said head comprises a diffuser cover, said diffuser cover comprises at least one non-diffusing region through which at least a part of said number of source light beams pass without being diffused, said diffuser cover further comprising at least one diffuser region that receives and diffuses at least a part of said light generated by said light sources, and wherein at least a part of said diffuser cover protrudes from said head and diffuses a part of said received light sidewards and backwards in relation to the source light beams.

15. The illumination system according to claim 14 wherein a plurality of said moving head light fixtures are arranged in a matrix.

16. The illumination system according to claim 15 wherein said central controller sends pixel data to said plurality of said moving head light fixtures in said matrix.

\* \* \* \* \*

UNITED STATES PATENT AND TRADEMARK OFFICE
CERTIFICATE OF CORRECTION

PATENT NO. : 8,950,895 B2  
APPLICATION NO. : 13/642176  
DATED : February 10, 2015  
INVENTOR(S) : Thomas Vinther and Claus Hansen Page 1 of 1

It is certified that error appears in the above-identified patent and that said Letters Patent is hereby corrected as shown below:

In the Claims  
Claim 1: Col. 6, line 40: delete "collecting means"  
Claim 11: Col. 7, line 43: delete "collecting means"  
Claim 11: Col. 7, line 47: delete "remitted"; insert --emitted--

Signed and Sealed this  
Fifteenth Day of September, 2015

Michelle K. Lee  
*Director of the United States Patent and Trademark Office*